(12) United States Patent
Cabral-McKeand

(10) Patent No.: US 10,549,910 B1
(45) Date of Patent: Feb. 4, 2020

(54) WALL-MOUNTED FRAME FOR SUPPORTING A RECYCLING BIN

(71) Applicant: Catherine Cabral-McKeand, Kitchener (CA)

(72) Inventor: Catherine Cabral-McKeand, Kitchener (CA)

( * ) Notice: Subject to any disclaimer, the term of this patent is extended or adjusted under 35 U.S.C. 154(b) by 0 days.

(21) Appl. No.: 16/247,645

(22) Filed: Jan. 15, 2019

(51) Int. Cl.
B65D 90/00 (2006.01)
B65F 1/14 (2006.01)
F16M 13/02 (2006.01)

(52) U.S. Cl.
CPC ............. *B65F 1/141* (2013.01); *F16M 13/02* (2013.01); *B65F 2210/18* (2013.01)

(58) Field of Classification Search
CPC .... B65F 1/1415; B65F 1/06; B65F 2240/138; B65F 1/141; B65F 2220/106
USPC ................................ 248/95, 97, 99, 100, 101
See application file for complete search history.

(56) References Cited

U.S. PATENT DOCUMENTS

| | | | |
|---|---|---|---|
| 2,113,153 A * | 4/1938 | Jonassen | B65B 67/1244 248/101 |
| 3,892,315 A | 7/1975 | Johnson | |
| 4,331,310 A | 5/1982 | Silva | |
| 4,527,695 A | 7/1985 | Arms | |
| 4,620,319 A * | 10/1986 | Sheehan | B65B 67/12 211/99 |
| 4,682,699 A | 7/1987 | Ertley | |
| 4,741,494 A | 5/1988 | Voomas | |
| 4,759,519 A * | 7/1988 | Cheng | B65B 67/1238 248/125.3 |
| RE33,842 E * | 3/1992 | Ebentheuer | B65B 67/1233 248/97 |
| 5,098,108 A * | 3/1992 | McKinney | A63B 21/1645 211/119.004 |
| 5,213,294 A | 5/1993 | DeBord | |
| 5,267,711 A * | 12/1993 | Perreault | B65B 67/1233 141/341 |
| 5,320,319 A | 6/1994 | Winger | |
| 5,356,001 A * | 10/1994 | Luna | A63B 63/083 206/315.1 |
| 5,494,186 A | 2/1996 | Marsh | |
| 5,803,299 A * | 9/1998 | Sealy, Jr. | B65F 1/062 220/495.07 |
| 6,068,221 A * | 5/2000 | Rosen | B65B 67/1205 224/553 |
| 6,616,109 B1 | 9/2003 | Jarrett | |
| 2013/0248471 A1 | 9/2013 | Evans | |

FOREIGN PATENT DOCUMENTS

GB 2411339 8/2005

\* cited by examiner

*Primary Examiner* — Steven M Marsh

(57) ABSTRACT

The wall-mounted frame for supporting a recycling bin is an adjustable diameter frame that mounts on a wall using a wall mount and one or more hinges. The width and depth of the frame may be adjusted by removing one or more of a plurality of retainers, sliding the corners of the frame relative to adjustment bars that are located between the corners, and depressing the retainers. The recycling bin drops through the opening in the frame and is supported by the lip of the recycling bin pressing against the frame. When the recycling bin is removed from the frame, the frame may pivot to a vertical orientation, parallel to the wall.

12 Claims, 4 Drawing Sheets

WALL-MOUNTED FRAME FOR SUPPORTING A RECYCLING BIN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of storage systems, more specifically, a wall-mounted frame for supporting a recycling bin.

SUMMARY OF INVENTION

The wall-mounted frame for supporting a recycling bin is an adjustable diameter frame that mounts on a wall using a wall mount and one or more hinges. The width and depth of the frame may be adjusted by removing one or more of a plurality of retainers, sliding the corners of the frame relative to adjustment bars that are located between the corners, and depressing the retainers. The recycling bin drops through the opening in the frame and is supported by the lip of the recycling bin pressing against the frame. When the recycling bin is removed from the frame, the frame may pivot to a vertical orientation, parallel to the wall.

An object of the invention is to suspend a recycling bin above the floor in an orientation that allows items to be recycled to be placed into the recycling bin.

Another object of the invention is to provide a frame for supporting the recycling bin by the lip of the recycling bin.

A further object of the invention is to provide a size adjustment for the frame so that recycling bins of various sizes may be accommodated.

Yet another object of the invention is to provide one or more hinges so that the frame may hang vertically when the recycling bin is removed.

These together with additional objects, features and advantages of the wall-mounted frame for supporting a recycling bin will be readily apparent to those of ordinary skill in the art upon reading the following detailed description of the presently preferred, but nonetheless illustrative, embodiments when taken in conjunction with the accompanying drawings.

In this respect, before explaining the current embodiments of the wall-mounted frame for supporting a recycling bin in detail, it is to be understood that the wall-mounted frame for supporting a recycling bin is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wall-mounted frame for supporting a recycling bin.

It is therefore important that the claims be regarded as including such equivalent construction insofar as they do not depart from the spirit and scope of the wall-mounted frame for supporting a recycling bin. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
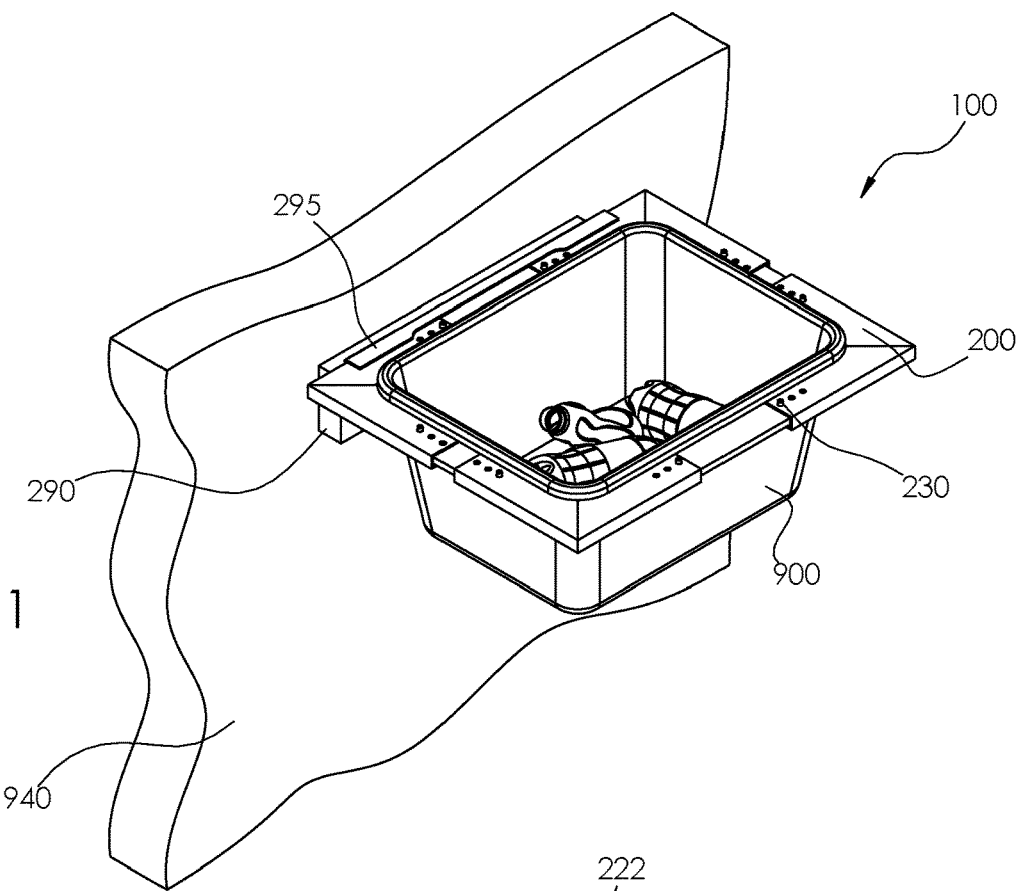
FIG. 1 is a perspective view of an embodiment of the disclosure illustrating the frame oriented perpendicular to the wall.
Figure 2:
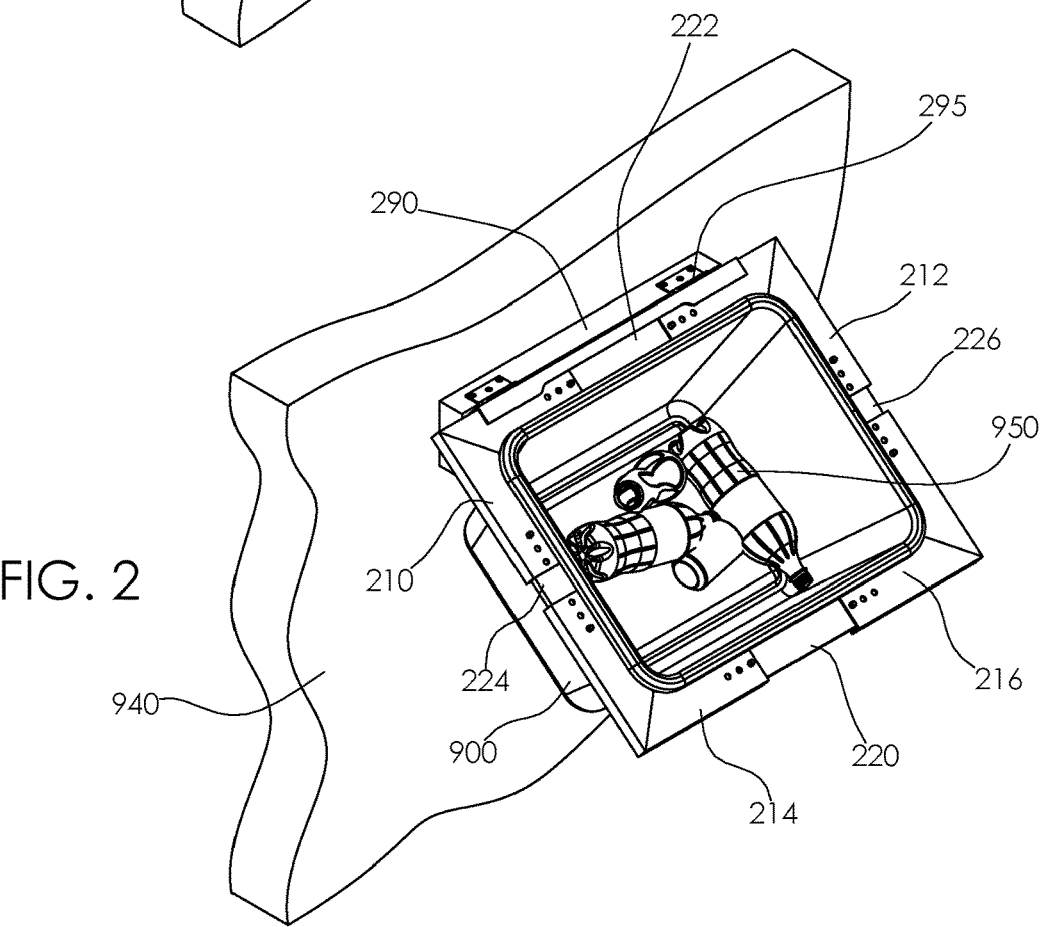
FIG. 2 is a perspective view of an embodiment of the disclosure illustrating the recycling bin resting against the wall.
Figure 3:
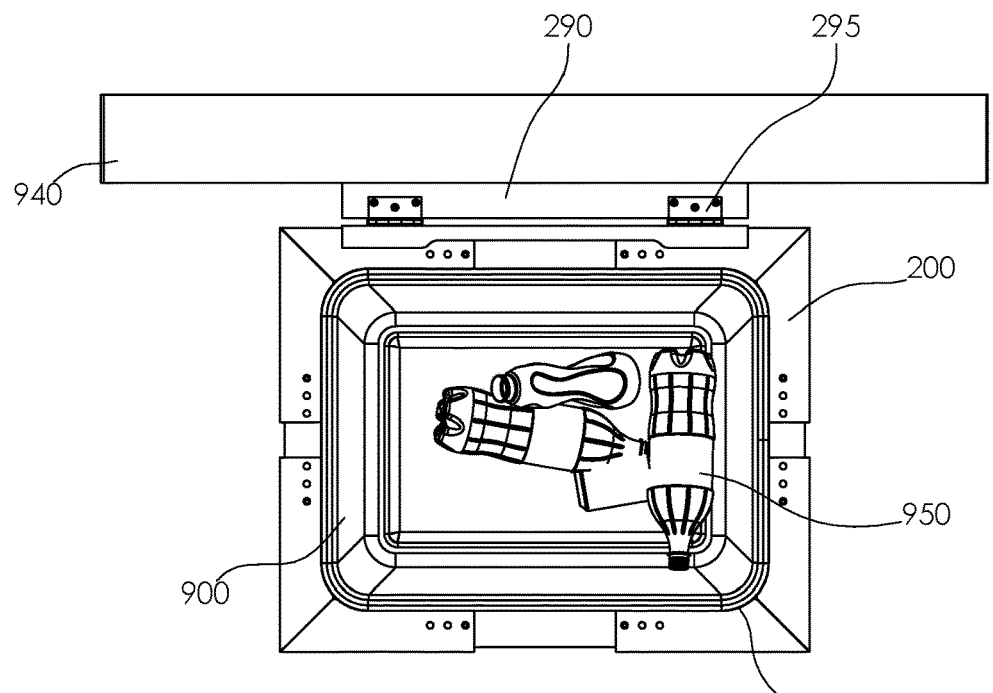
FIG. 3 is a top view of an embodiment of the disclosure illustrating the frame oriented perpendicular to the wall.
Figure 4:
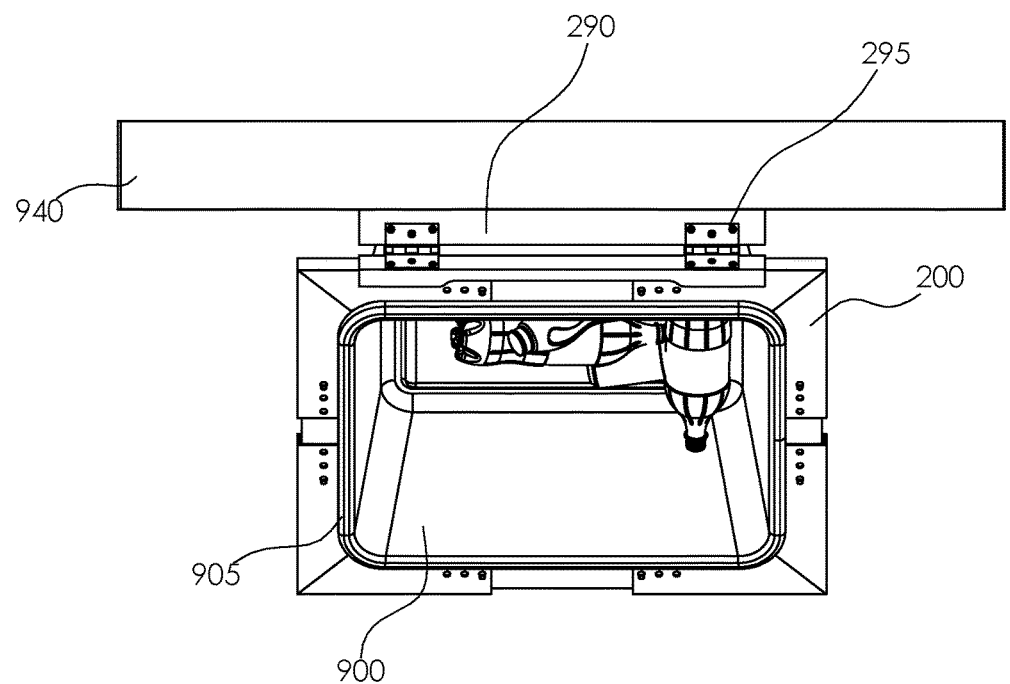
FIG. 4 is a top view of an embodiment of the disclosure illustrating the recycling bin resting against the wall.
Figure 5:
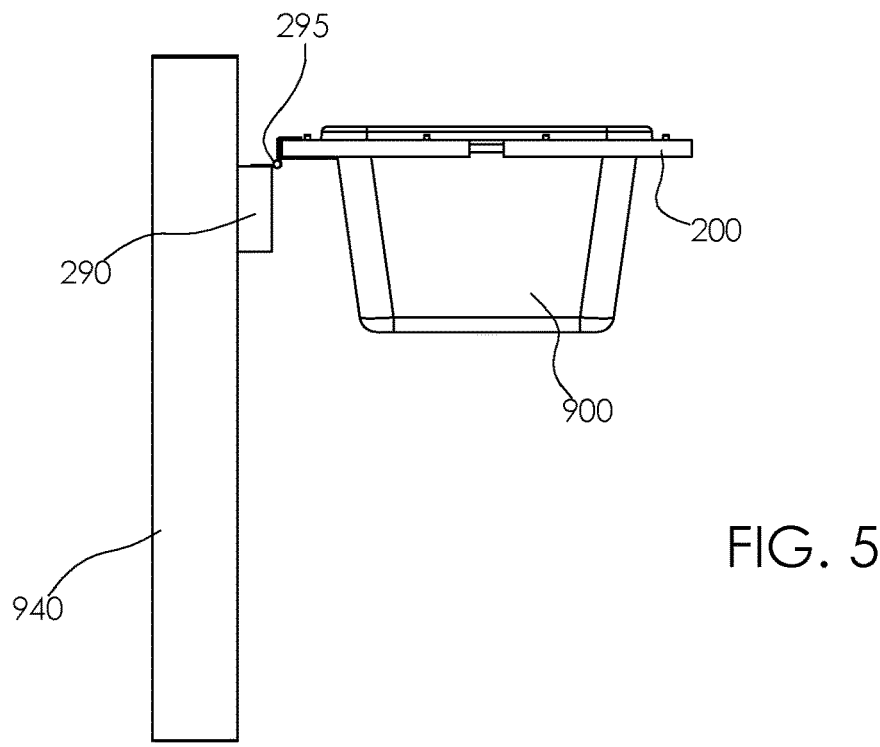
FIG. 5 is a side view of an embodiment of the disclosure illustrating the frame oriented perpendicular to the wall.
Figure 6:
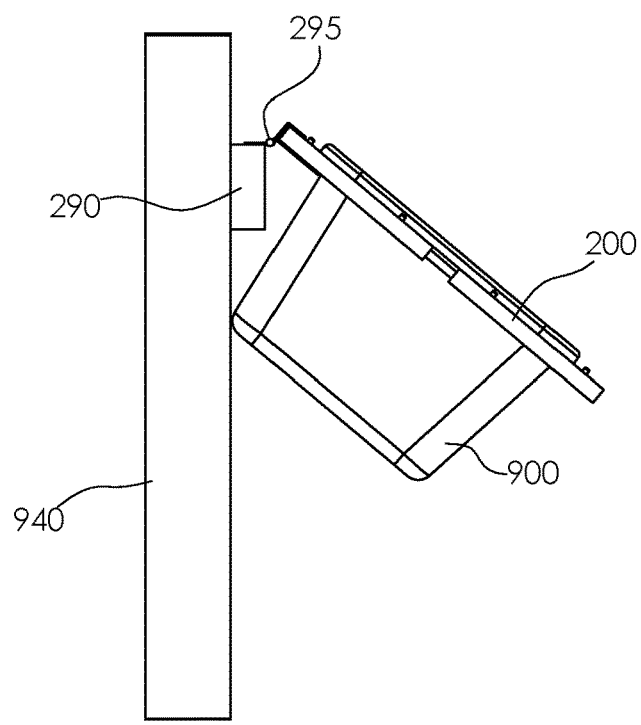
FIG. 6 is a side view of an embodiment of the disclosure illustrating the recycling bin resting against the wall.
Figure 7:
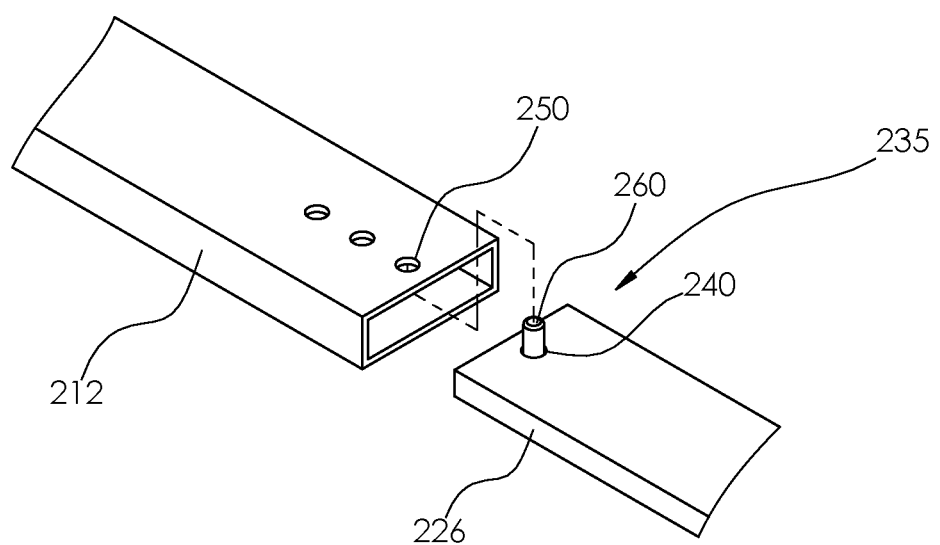
FIG. 7 is a detail view of an embodiment of the disclosure illustrating.

Detailed reference will now be made to a first potential embodiment of the disclosure, which is illustrated in FIGS. 1 through 7.

The wall-mounted frame for supporting a recycling bin 100 (hereinafter invention) comprises a bin frame 200, a wall mount 290, and one or more hinges 295. The invention 100 is a wall-mounted holder for a recycling bin 900 that holds the recycling bin 900 above the floor and in an upright orientation when the recycling bin 900 is inserted into the invention 100. The invention 100 hangs parallel to a wall 940 when the recycling bin 900 is removed from the invention 100.

The bin frame 200 comprises a left rear corner 210, a right rear corner 212, a left front corner 214, a right front corner 216, a front adjustment bar 220, a left adjustment bar 224, a right adjustment bar 226, a rear adjustment bar 222, and a plurality of retainers 230. The bin frame 200 surrounds the top of the recycling bin 900 and suspends the recycling bin 900 on the wall 940 by preventing a lip 905 of the recycling bin 900 from sliding through the bin frame 200.

An individual adjustment bar selected from the front adjustment bar 220, the rear adjustment bar 222, the left adjustment bar 224, and the right adjustment bar 226 may be a rectangular armature that comprises a rectangular longitudinal cross section. The individual adjustment bar may comprise a plurality of size adjustment apertures 240. The plurality of size adjustment apertures 240 may be a series of holes oriented vertically through the individual adjustment bar and equally spaced along the longitudinal axis of the individual adjustment bar.

An individual corner selected from the left rear corner 210, the right rear corner 212, the left front corner 214, and the right front corner 216 may be a hollow channel that is L-shaped when viewed from overhead. Each end of the individual corner may present a rectangular vertical cross section that is sized such that the individual adjustment bar may slide into and out of the ends of the individual corner. Each end of the individual corner may comprise a top retention aperture 250 and a bottom retention aperture 255. The top retention aperture 250 may be located in the top surface of the individual corner and the bottom retention aperture 255 may be located in the bottom surface of the individual corner such that the top retention aperture 250 is aligned vertically above the bottom retention aperture 255.

The individual corner couples to the individual adjustment bar by sliding an end of the individual adjustment bar into an end of the individual corner until the top retention aperture 250 and the bottom retention aperture 255 align with one of the plurality of size adjustment apertures 240 on the individual adjustment bar. One of the plurality of retainers 230 may be inserted into the top retention aperture 250 and may pass through the individual adjustment bar via one of the plurality of size adjustment apertures 240 and into the bottom retention aperture 255. The presence of one of the plurality of retainers 230 prevents the individual adjustment bar from sliding relative to the individual corner.

The length of any side of the bin frame 200 may be adjusted by removing one or more of the plurality of retainers 230 from that side, sliding the individual adjustment bar into or out of the individual corners at each end of the individual adjustment bar, and reinstalling one or more the plurality of retainers 230. The length of each side of the bin frame 200 may be adjusted such that the bin frame 200 surrounds the perimeter of the recycling bin 900 below and adjacent to the lip 905 on the recycling bin 900. The lip 905 is prevented from passing through the bin frame 200 because the dimensions of the lip 905 are larger than the inside dimensions of the bin frame 200.

The front end of the left rear corner 210 couples to the rear end of the left adjustment bar 224. The right end of the left rear corner 210 couples to the left end of the rear adjustment bar 222.

The left end of the right rear corner 212 couples to the right end of the rear adjustment bar 222. The front end of the right rear corner 212 couples to the rear end of the right adjustment bar 226.

The rear end of the left front corner 214 couples to the front end of the left adjustment bar 224. The right end of the left front corner 214 couples to the left end of the front adjustment bar 220.

The rear end of the right front corner 216 couples to the front end of the right adjustment bar 226. The left end of the right front corner 216 couples to the right end of the front adjustment bar 220.

An individual retainer 235 selected from the plurality of retainers 230 is further defined with a shaft. The shaft 265 may pass through the top retention aperture 250, through one of the plurality of size adjustment apertures 240 to prevent movement of the individual adjustment bar relative to the individual corner. The width of the shaft 265 may be less than or equal to the diameter of the top retention aperture 250. The plurality of retainers 230 are more commonly referred to as spring-loaded buttons. A spring (not depicted) is located inside of the respective adjustment bar (220, 222, 224, and 226) in order to bias the shaft 265 of the individual retainer 235 outwards. This is to say that the individual retainer 235 is able to be pressed downwards in order to provide clearance with the top retention aperture 250 in order to enable adjustment as needed.

The wall mount 290 may be an armature that attaches to the wall 940 and couples to the bin frame 200 via the one or more hinges 295. As a non-limiting example, the wall mount 290 may bolt to the wall 940 using lag screws, wall anchors, toggle bolts, or other wall fasteners. The wall mount 290 may be oriented horizontally such that the top of the recycling bin 900 is horizontal and level when the bin frame 200 is pivoted to a position that is oriented perpendicular to the wall 940.

The one or more hinges 295 may couple to the wall mount 290 and to the bin frame 200. The one or more hinges 295 may pivot by at least 90 degrees such that the bin frame 200 may be extended to be perpendicular to the wall 940 when the recycling bin 900 is inserted into the bin frame 200 and the bin frame 200 may hang parallel to the wall 940 when the recycling bin 900 is removed from the bin frame 200.

In use, the wall mount 290 is coupled to the wall 940 and the bin frame 200 is pivoted away from the wall 940 to a position that places the bin frame 200 perpendicular to the wall 940. The recycling bin 900 may be lowered into the opening of the bin frame 200 until the lip 905 of the recycling bin 900 rests on the bin frame 200. When the bin frame 200 is released it may remain perpendicular to the wall 940 or may sag until the bottom of the recycling bin 900 touches the wall 940. One or more items to be recycled 950 may be placed into the recycling bin 900. In preparation for pickup, the recycling bin 900 may be lifted from the bin frame 200 and taken to the curb or other pickup location. While the recycling bin 900 is removed from the bin frame 200, the bin frame 200 may hang parallel to the wall 940, where the invention 100 will be out of the way.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, "align" refers to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "anchor" is a device that holds an object in place. When used as a verb, "anchor" refers to holding an object firmly or securely.

As used in this disclosure, an "aperture" is an opening in a surface. Aperture may be synonymous with hole, slit, crack, gap, slot, or opening.

As used herein, "captive hardware" or "captive fastener" refers to a type of fastener where at least one part of the fastener is retained by one of the parts that the fastener is intended to couple. A captive fastener is often made with thread locking, press-fitting, or broaching to accomplish an anchor-hold within a larger assembly housing. However, a captive fastener may also be melded with the material into which it is joined, either through cold forming or welding. Cage nuts and captive screws are non-limiting examples of captive hardware.

As used herein, the words "couple", "couples", "coupled" or "coupling", refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, "horizontal" is a directional term that refers to a direction that is perpendicular to the local force of gravity. Unless specifically noted in this disclosure, the horizontal direction is always perpendicular to the vertical direction.

As used herein, the word "longitudinal" or "longitudinally" refers to a lengthwise or longest direction.

As used herein, "mate" refers to coupling at a predefined interface.

As used in this disclosure, "orientation" refers to the positioning and/or angular alignment of a first object relative to a second object or relative to a reference position or reference direction.

As used in this disclosure, a "perimeter" is one or more curved or straight lines that bound an enclosed area on a plane or surface. The perimeter of a circle is commonly referred to as a circumference.

As used in this disclosure, the term "shaft" is used to describe a rigid cylinder that is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A wall-mounted frame for supporting a recycling bin comprising:
    a bin frame, a wall mount, and one or more hinges;
    wherein the wall-mounted frame for supporting a recycling bin is a wall-mounted holder for a recycling bin that holds the recycling bin above a floor and in an upright orientation when the recycling bin is inserted into the wall-mounted frame for supporting a recycling bin;
    wherein the wall-mounted frame for supporting a recycling bin hangs parallel to a wall when the recycling bin is removed from the wall-mounted frame for supporting a recycling bin;
    wherein the bin frame comprises a left rear corner, a right rear corner, a left front corner, a right front corner, a front adjustment bar, a left adjustment bar, a right adjustment bar, a rear adjustment bar, and a plurality of retainers;
    wherein the bin frame surrounds a top of the recycling bin and suspends the recycling bin on the wall by preventing a lip of the recycling bin from sliding through the bin frame;
    wherein an individual adjustment bar selected from the front adjustment bar, the rear adjustment bar, the left adjustment bar, and the right adjustment bar is a rectangular armature that comprises a rectangular longitudinal cross section;
    wherein the individual adjustment bar comprises a plurality of size adjustment apertures;
    wherein the plurality of size adjustment apertures are a series of holes oriented vertically through the individual adjustment bar and equally spaced along the longitudinal axis of the individual adjustment bar;
    wherein an individual corner selected from the left rear corner, the right rear corner, the left front corner, and the right front corner is a hollow channel that is L-shaped when viewed from overhead;
    wherein each end of the individual corner presents a rectangular vertical cross section that is sized such that the individual adjustment bar slides into and out of the ends of the individual corner;
    wherein each end of the individual corner comprises a top retention aperture and a bottom retention aperture;
    wherein the top retention aperture is located in the top surface of the individual corner and the bottom retention aperture is located in the bottom surface of the individual corner.

2. The wall-mounted frame for supporting a recycling bin according to claim 1
    wherein the top retention aperture is aligned vertically above the bottom retention aperture.

3. The wall-mounted frame for supporting a recycling bin according to claim 2
   wherein the individual corner couples to the individual adjustment bar by sliding an end of the individual adjustment bar into an end of the individual corner until the top retention aperture and the bottom retention aperture align with one of the plurality of size adjustment apertures on the individual adjustment bar;
   wherein one of the plurality of retainers is inserted into the top retention aperture and passes through the individual adjustment bar via one of the plurality of size adjustment apertures;
   wherein the presence of one of the plurality of retainers prevents the individual adjustment bar from sliding relative to the individual corner.

4. The wall-mounted frame for supporting a recycling bin according to claim 3
   wherein the length of any side of the bin frame is adjusted by removing one or more of the plurality of retainers from that side, sliding the individual adjustment bar into or out of the individual corners at each end of the individual adjustment bar, and reinstalling one or more the plurality of retainers.

5. The wall-mounted frame for supporting a recycling bin according to claim 4
   wherein the length of each side of the bin frame is adjusted such that the bin frame surrounds the perimeter of the recycling bin below and adjacent to the lip on the recycling bin;
   wherein the lip is prevented from passing through the bin frame because the dimensions of the lip are larger than the inside dimensions of the bin frame.

6. The wall-mounted frame for supporting a recycling bin according to claim 5
   wherein the front end of the left rear corner couples to the rear end of the left adjustment bar;
   wherein the right end of the left rear corner couples to the left end of the rear adjustment bar.

7. The wall-mounted frame for supporting a recycling bin according to claim 6
   wherein the left end of the right rear corner couples to the right end of the rear adjustment bar;
   wherein the front end of the right rear corner couples to the rear end of the right adjustment bar.

8. The wall-mounted frame for supporting a recycling bin according to claim 7
   wherein the rear end of the left front corner couples to the front end of the left adjustment bar;
   wherein the right end of the left front corner couples to the left end of the front adjustment bar.

9. The wall-mounted frame for supporting a recycling bin according to claim 8
   wherein the rear end of the right front corner couples to the front end of the right adjustment bar;
   wherein the left end of the right front corner couples to the right end of the front adjustment bar.

10. The wall-mounted frame for supporting a recycling bin according to claim 9
    wherein an individual retainer selected from the plurality of retainers comprises a shaft;
    wherein the shaft may pass through the top retention aperture, through one of the plurality of size adjustment apertures;
    wherein the width of the shaft may be less than or equal to the diameter of the top retention aperture;
    wherein the plurality of retainers are spring-loaded buttons.

11. The wall-mounted frame for supporting a recycling bin according to claim 10
    wherein the wall mount is an armature that attaches to the wall and couples to the bin frame via the one or more hinges;
    wherein the wall mount is oriented horizontally such that the top of the recycling bin is horizontal and level when the bin frame is pivoted to a position that is oriented perpendicular to the wall.

12. The wall-mounted frame for supporting a recycling bin according to claim 11
    wherein the one or more hinges couple to the wall mount and to the bin frame;
    wherein the one or more hinges pivot by at least 90 degrees such that the bin frame is extended to be perpendicular to the wall when the recycling bin is inserted into the bin frame and the bin frame hangs parallel to the wall when the recycling bin is removed from the bin frame.

* * * * *